United States Patent
Grebe et al.

(10) Patent No.: US 10,632,730 B2
(45) Date of Patent: Apr. 28, 2020

(54) PROCESS FOR MELTING/SINTERING POWDER PARTICLES FOR LAYER-BY-LAYER PRODUCTION OF THREE-DIMENSIONAL OBJECTS

(71) Applicant: Evonik Operations GmbH, Essen (DE)

(72) Inventors: Maik Grebe, Bochum (DE); Wolfgang Diekmann, Waltrop (DE); Sigrid Hessel-Geldmann, Haltern am See (DE); Juergen Kreutz, Marl (DE)

(73) Assignee: Evonik Operations GmbH, Essen (DE)

( * ) Notice: Subject to any disclaimer, the term of this patent is extended or adjusted under 35 U.S.C. 154(b) by 235 days.

(21) Appl. No.: 15/468,465

(22) Filed: Mar. 24, 2017

(65) Prior Publication Data
US 2017/0274591 A1 Sep. 28, 2017

(30) Foreign Application Priority Data
Mar. 24, 2016 (DE) .................. 10 2016 205 053

(51) Int. Cl.
| | | |
|---|---|---|
| *B29C 67/00* | (2017.01) | |
| *B33Y 10/00* | (2015.01) | |
| *B29C 64/153* | (2017.01) | |
| *B29C 64/295* | (2017.01) | |
| *B22F 3/105* | (2006.01) | |
| *B33Y 30/00* | (2015.01) | |
| *B33Y 70/00* | (2020.01) | |
| *B33Y 80/00* | (2015.01) | |
| *B29K 71/00* | (2006.01) | |
| *B29K 77/00* | (2006.01) | |

(52) U.S. Cl.
CPC ............ *B33Y 10/00* (2014.12); *B29C 64/153* (2017.08); *B29C 64/295* (2017.08); *B22F 3/1055* (2013.01); *B29K 2071/00* (2013.01); *B29K 2077/00* (2013.01); *B29K 2995/0012* (2013.01); *B33Y 30/00* (2014.12); *B33Y 70/00* (2014.12); *B33Y 80/00* (2014.12); *Y02P 10/295* (2015.11)

(58) Field of Classification Search
CPC ...................................................... B29C 64/13
See application file for complete search history.

(56) References Cited

U.S. PATENT DOCUMENTS

| | | | |
|---|---|---|---|
| 5,342,919 | A | 8/1994 | Dickens, Jr. et al. |
| 5,527,877 | A | 6/1996 | Dickens, Jr. et al. |
| 5,648,450 | A | 7/1997 | Dickens, Jr. et al. |
| 5,990,268 | A | 11/1999 | Dickens, Jr. et al. |
| 6,007,764 | A | 12/1999 | Benda et al. |
| 6,136,948 | A | 10/2000 | Dickens, Jr. et al. |
| 9,162,392 | B2 | 10/2015 | Grebe et al. |
| 2003/0052105 | A1* | 3/2003 | Nagano ............. B23K 26/0604 219/121.83 |
| 2004/0104499 | A1 | 6/2004 | Keller |
| 2007/0238056 | A1 | 10/2007 | Baumann et al. |
| 2008/0131104 | A1 | 6/2008 | Philippi |
| 2009/0017220 | A1* | 1/2009 | Muller .................. B33Y 10/00 427/493 |
| 2014/0035205 | A1 | 2/2014 | Hagiwara et al. |
| 2014/0314613 | A1 | 10/2014 | Hopkinson et al. |
| 2015/0054200 | A1 | 2/2015 | Fruth |

FOREIGN PATENT DOCUMENTS

| | | |
|---|---|---|
| DE | 10 2013 109 162 A1 | 2/2015 |
| EP | 2 177 557 A1 | 4/2010 |
| EP | 2 586 597 A1 | 5/2013 |
| JP | 2004-074800 | 3/2004 |
| JP | 2005-120347 | 5/2005 |
| JP | 2008-542529 | 11/2008 |
| JP | 2014-527481 | 10/2014 |
| WO | WO 2005/105412 A1 | 11/2005 |

* cited by examiner

*Primary Examiner* — Joseph A Miller, Jr.
(74) *Attorney, Agent, or Firm* — Grüneberg and Myers PLLC

(57) ABSTRACT

A process for melting/sintering powder particles for layer-by-layer production of three-dimensional objects is performed by a)applying a layer of a powder material solidifiable under the action of electromagnetic radiation, b) heating the powder material to not more than 10 K below the melting point according to DIN 53765 by a radiation from a heat-radiating element whose maximum radiation intensity is at a wavelength of 5000 nm or at longer wavelengths, c) selective melting/sintering of at least a region of the powder material which corresponds to the cross section of the three-dimensional object, d)repeating steps a) to c) until the three-dimensional object is obtained.

4 Claims, 2 Drawing Sheets

PROCESS FOR MELTING/SINTERING POWDER PARTICLES FOR LAYER-BY-LAYER PRODUCTION OF THREE-DIMENSIONAL OBJECTS

BACKGROUND OF THE INVENTION

Field of the Invention

The present invention relates to a process for melting/sintering powder particles for layer-by-layer production of three-dimensional objects.

Description of the Related Art

The rapid provision of prototypes or small batches is a problem that has frequently been encountered in recent times. Processes that enable this are called rapid prototyping/rapid manufacturing or additive fabrication methods or else just 3D printing. Particularly suitable processes are those in which the desired structures are produced layer by layer, by selective melting and/or consolidation of pulverulent materials. The processes that work according to this principle are referred to collectively by the umbrella term powder bed fusion.

One example of a powder bed fusion process is selective laser sintering (SLS). In this process, powders are briefly selectively irradiated with a laser beam in a chamber, thus melting the powder particles struck by the laser beam. The molten particles coalesce and rapidly resolidify to form a solid mass. By repeated irradiation of a constant succession of freshly applied layers, this process can be used for rapid and simple production of three-dimensional articles.

The process of laser sintering for the purpose of producing shaped articles from pulverulent polymers is described extensively in patents U.S. Pat. No. 6,136,948 and WO 9606881 (both DTM Corporation). WO9208566 describes an annular radiative heating means with which the build region is heated. DE102005024790 A1 describes a radiative heating means with which the build region is rapidly heated with a surface-radiating element, in particular made of graphite.

Further examples of powder bed fusion processes are described in patent specifications U.S. Pat. No. 6,531,086 and EP1740367.

The temperature of the pulverulent polymer in the powder bed is of decisive importance for process safety and the quality of the three-dimensional articles produced by the process. A highest possible temperature of the particles at the surface of the powder bed has the advantage that less energy now needs to be introduced selectively, for example via a laser beam. Additional introduction of energy (post-sintering) after irradiation by the laser for example is then no longer necessary.

In addition, a high temperature of the powder particles at the surface of the powder bed has the advantage that warpage of the just-melted melt layer is minimized. Severe warpage of the melt layer, in particular bending/rolling-up of the edges, is typically described as curling. In order to avoid curling, in particular during processing of polymer material, the temperature of the surface of the powder bed is thus controlled to ensure that warpage/curling is minimized while also ensuring that the powder does not already undergo sintering or melting as a result of the heating. For many polymer powders this process temperature is often only 10-20° C. below the melting point of the polymer powder. A newly applied powder layer should also be heated as rapidly as possible to increase the speed of the build process. In the related art the heating of the surface of the powder bed is therefore effected by means of heat-radiating elements whose radiation has an intensity maximum at a wavelength of about 1400 nm.

In addition to the abovementioned advantages of a high process temperature there are also decisive disadvantages. Aging of the polymer increases dramatically with increasing temperature. It is customary that fabrication using a powder bed fusion process requires many hours. This therefore results in a high level of thermal stress for the polymeric build material. It is a consequence of the related art radiant heating means that deeper layers in the powder bed are also heated by the electromagnetic rays and thus subjected to undesired thermal stress.

SUMMARY OF THE INVENTION

It is an object of the present invention to provide an improved process for producing three-dimensional objects, wherein the surface of the powder bed is heated by radiant heating and introduction of energy by radiation into deeper layers is avoided. It is a further object to ensure sufficiently rapid and uniform heating of the powder bed surface.

It has now been found that, surprisingly, heat-radiating elements giving off radiation having a maximum radiation intensity at a wavelength of 5000 nm or longer wavelengths make it possible to achieve rapid heating of the uppermost powder layer without excessively heating the powder layers located therebelow by means of electromagnetic radiation. The uppermost powder layer is defined here as the uppermost 0.5 mm of the bulk powder of the powder bed, independently of the layer thickness used in the layer-by-layer application of the powder. The wavelength of the maximum radiation intensity of the heat-radiating elements is determined by measuring the temperature of the heat-radiating elements (testo 735-1 instrument with PT100 sensors) and then calculating using Wien's displacement law (using 2897800 nm. K as Wien's constant) the wavelength in nm having the maximum radiation intensity.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein.

DETAILED DESCRIPTION OF THE INVENTION

Figure 1:
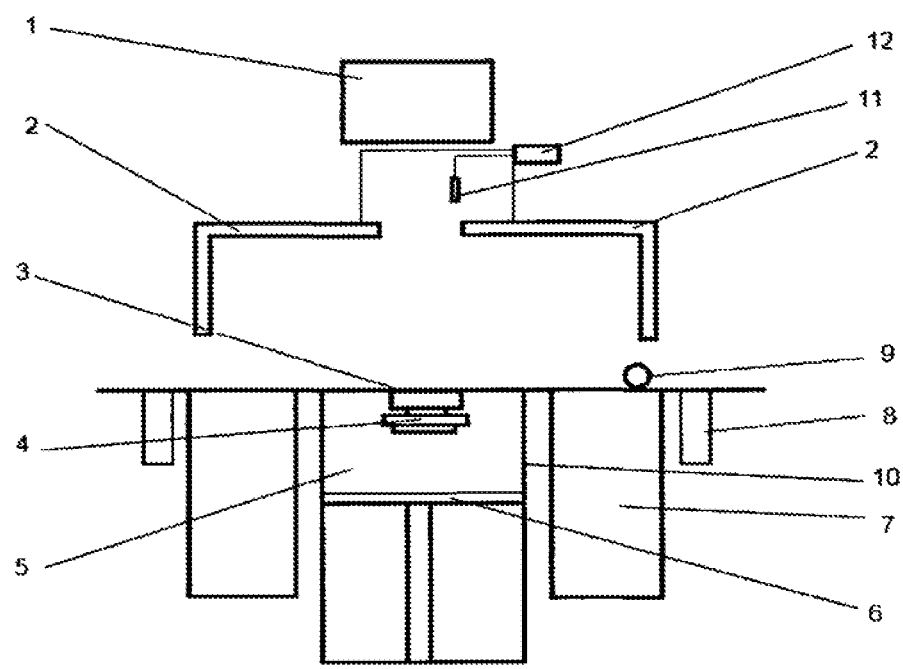
FIG. 1 shows an apparatus for producing three-dimensional objects.
Figure 2:
FIG. 2 shows integrated radiant heating with a heat source and heat-radiating elements.
Figure 3:
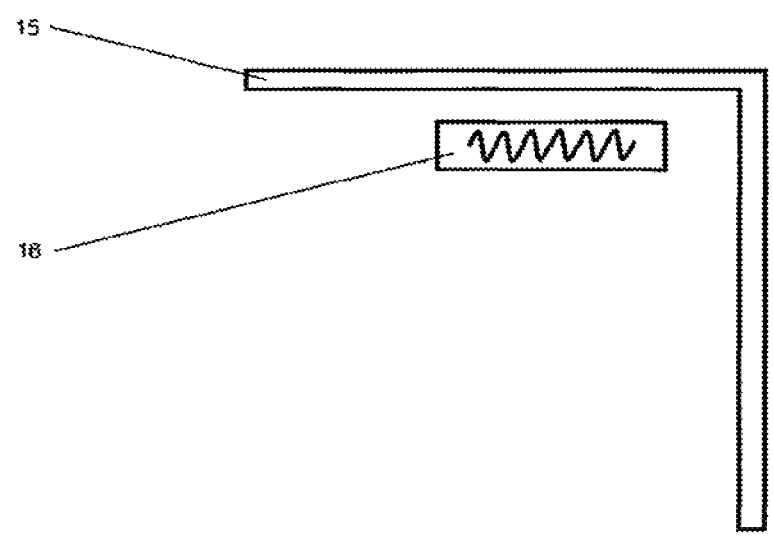
FIG. 3. shows heat-radiating elements and heat source as separate components.

The present invention provides a process for layer-by-layer production of three-dimensional objects, wherein in a first step a height-adjustable build platform (6) is lowered into a build frame (10) and using an apparatus (9) a layer of a material solidifiable under the action of electromagnetic radiation is applied to the build platform (6), wherein the powder material is supplied by means of a powder metering device (7). Excess powder material is pushed into an overflow container (8). In a second step the powder material is heated via a heating system consisting of radiant heating means (2), temperature measuring device (11) and temperature controller (12). The heating of the powder material is effected by means of a radiation having a maximum radiation intensity at a wavelength of 5000 nm or longer wavelengths. The heating of the powder material is preferably effected by means of a radiation having a maximum radiation intensity at a wavelength of 5250 nm or longer wavelengths, particularly preferably 6000 nm or longer wavelengths. The heating of the powder material is especially preferably effected by means of a radiation having a maximum radiation intensity at a wavelength of 7000 nm or longer wavelengths. In a third step an electromagnetic-radiation-emitting radiation source (1) is used to effect selective melting/sintering at the desired locations on the surface of the powder bed (3). These steps are repeated until a three-dimensional object (4) is formed layer by layer. After termination of the build process and any necessary cooling of the powder cake (5) the three-dimensional object (4) may be removed from the powder cake.

The wavelength of the maximum radiation intensity should vary by less than 20%. It is preferable when the wavelength of the maximum radiation intensity varies by not more than 10%. It is particularly preferable when the wavelength of the maximum radiation intensity varies by not more than 5%.

Heat-radiating elements having a maximum radiation intensity at a wavelength of over 5000 nm are regarded as sluggish and rapid temperature control therefore appears difficult to achieve. It was found that, surprisingly, simultaneous irradiation of the surface of the powder bed with high-surface-area heat-radiating elements from different directions makes it possible to achieve rapid heating of the surface of the powder bed even with electromagnetic radiation having a maximum intensity at a wavelength of 5000 nm or higher wavelengths. The irradiation power is preferably at least 2000 W/m$^2$ based on the vertically projected area of the powder bed that is to be heated. The vertically projected area of the powder bed also corresponds to the area of the build region which is bounded by the build frame. The irradiation power is particularly preferably at least 3000 W/m$^2$ based on the vertically projected area of the powder bed that is to be heated. The area of the heat-radiating elements which gives off the electromagnetic rays to the surface of the powder bed is at least 100% of the vertically projected area of the powder bed that is to be heated. The area of the heat-radiating elements which gives off the electromagnetic rays to the surface of the powder bed is preferably at least 150% of the vertically projected area of the powder bed that is to be heated. The area of the heat-radiating elements which gives off the electromagnetic rays to the surface of the powder bed is preferably at least 200% of the vertically projected area of the powder bed that is to be heated.

FIG. 1 shows the in-principle construction of an apparatus for producing three-dimensional objects. The present invention further provides an apparatus for layer-by-layer production of three-dimensional objects. The apparatus comprises a build frame (10) having a height adjustable build platform (6), an apparatus (9) for applying a layer of a material solidifiable under the action of electromagnetic radiation to the build platform (6), a radiant heating means (2) and an electromagnetic radiation source (1) with which the solidifiable material is selectively melted/sintered. The radiant heating means consists of a heat source and of heat-radiating elements. The temperature control means in turn consists of a temperature measuring device (11) and a control unit (12). The temperature measuring device is advantageously a noncontact radiative thermometer.

The area of the heat-radiating elements (2) which give off the electromagnetic rays to the surface of the powder bed is altogether at least 100% of the vertically projected area of the powder bed which is bounded by the build frame (10). It is preferable when the area of the heat-radiating elements which give off the electromagnetic rays to the surface of the powder bed is at least 150% of the vertically projected area of the powder bed which is bounded by the build frame (10). It is particularly preferable when the area of the heat-radiating elements which give off the electromagnetic rays to the surface of the powder bed is at least 200% of the vertically projected area of the powder bed which is bounded by the build frame (10). The total emissivity in the direction of the face normal of the heat-radiating elements is at least 0.2. The total emissivity in the direction of the face normal of the heat-radiating elements is preferably at least 0.5. The heat-radiating elements are configured such that the intensity maximum of the radiation from the heat-radiating elements is at a wavelength of at least 5000 nm. The heat-radiating elements are preferably configured such that the intensity maximum of the radiation from the heat-radiating elements is at a wavelength of at least 5250 nm, particularly preferably of at least 6000 nm. The heat-radiating elements are especially preferably configured such that the intensity maximum of the radiation from the heat-radiating elements is at a wavelength of at least 7000 nm.

The heat-radiating elements are configured such that the intensity maximum of the radiation from the heat-radiating elements varies by not more than 20%. The heat-radiating elements are preferably configured such that the intensity maximum of the radiation from the heat-radiating elements varies by not more than 10%. The heat-radiating elements are configured such that the intensity maximum of the radiation from the heat-radiating elements particularly preferably varies by not more than 20%. The heating of the heat-radiating elements may be effected for example by induction, convection, conduction or electromagnetic radiation via a heat source. The radiant emittance of the heat-radiating elements is at least 500W/m$^2$. The radiant emittance of the heat-radiating elements is preferably at least 1000W/m$^2$. In the radiant heating means the heat source (14) and the heat-radiating elements (13) may be integrated in one component i.e. the heat source may be completely enclosed by the heat-radiating elements or the heat-radiating element (15) and the heat source (16) may exist as separate components. In a preferred embodiment the heat-radiating elements may be heated independently of one another in order to adjust the temperature distribution at the surface of the powder bed uniformly.

All powders known to those skilled in the art are in principle suitable for use in the apparatus according to the invention/the process according to the invention. Powders of polyamides, copolyamides, polyesters, copolyesters, polyether amides and polyether ketones are particularly suitable. Polymer powders having an absorptivity of greater than 0.8 at a wavelength of 5000 nm are particularly suitable. Polymer powders having an absorptivity of greater than 0.9 at a wavelength of 5000 nm are very particularly suitable. The three-dimensional objects produced by the processes according to the invention likewise form part of the subject matter of the present invention.

Even without further intimations, it is assumed that a skilled person will be able to utilize the above description to its widest extent. The preferred embodiments and examples are therefore to be interpreted merely as a descriptive disclosure which is by no means limiting in any way whatsoever. The present invention is elucidated in more detail below using examples. Alternative embodiments of the present invention are obtainable analogously.

Having generally described this invention, a further understanding can be obtained by reference to certain specific examples which are provided herein for purposes of illustration only, and are not intended to be limiting unless otherwise specified.

EXAMPLES

Example 1

Noninventive

A powder of polyamide 12 having the characteristics reported in Table 1 was applied in a build region having dimensions of 35×35 cm and an area of 1225 cm$^2$ at room temperature (23° C.) to form a powder bed of 100 mm in height. A radiative heating means whose heat-radiating elements emit a radiation having an intensity maximum at a wavelength of 1400 nm heated the powder bed. The wavelength of the maximum radiation intensity varied by more than 30%. The area of the heat-radiating elements was 224 cm$^2$. The temperature at the surface of the powder bed and at a depth of 20 mm in the powder bed was measured and recorded. The results are reported in Table 4.

Example 2

Noninventive

A polymer powder having the characteristics reported in Table 1 was applied in a build region having dimensions of 35×35 cm and an area of 1225 cm$^2$ to form a powder bed of 100 mm in height. A radiative heating means having heat-radiating elements consisting of graphite foils which emits a radiation having an intensity maximum at a wavelength of 2000 nm heated the powder bed. The area of the heat-radiating elements was 775 cm$^2$. The temperature at the surface of the powder bed and at a depth of 20 mm in the powder bed was measured and recorded. The results are reported in Table 5.

Example 3

Inventive

A polymer powder having the characteristics reported in Table 1 was applied in a build region having dimensions of 35×35 cm and an area of 1225 cm$^2$ to form a powder bed of 100 mm in height. The powder bed was heated using a radiative heating means. The heat-radiating elements of the radiative heating means emit a radiation having an intensity maximum at a wavelength of 6200 nm. The wavelength of the maximum radiation intensity varied by less than 10%. The area of the heat-radiating elements was 1852 cm$^2$. The temperature at the surface of the powder bed and at a depth of 20 mm in the powder bed was measured and recorded. The results are reported in Table 6. The temperature at the surface increased markedly more rapidly here compared to the noninventive examples. By contrast, the temperature at a depth of 20 mm increased only very slowly. It was thus possible to increase the temperature at the surface of the powder bed without excessively heating, and thus unnecessarily subjecting to thermal stress, the powder in lower powder layers.

Example 4

Inventive

A polymer powder having the characteristics reported in Table 2 was applied in a build region having dimensions of 35×35 cm and an area of 1225 cm$^2$ to form a powder bed of 100 mm in height. The powder bed was heated using a radiative heating means. The heat-radiating elements of the radiative heating means emit a radiation having an intensity maximum at a wavelength of 5700 nm. The wavelength of the maximum radiation intensity varies by less than 10%. The area of the heat-radiating elements was 2466 cm$^2$. The temperature at the surface of the powder bed and at a depth of 20 mm in the powder bed was measured and recorded. The results are reported in Table 7. The temperature at the surface increases markedly more rapidly here compared to the noninventive examples. By contrast, the temperature at a depth of 20 mm increases only very slowly. It was thus possible to increase the temperature at the surface of the powder bed without excessively heating, and thus unnecessarily subjecting to thermal stress, the powder in lower powder layers.

Example 5

Inventive

A polymer powder having the characteristics reported in Table 3 was applied in a build region having dimensions of 35×35 cm and an area of 1225 cm$^2$ to form a powder bed of 100 mm in height. The powder bed was heated using a radiative heating means. The heat-radiating elements of the radiative heating means emit a radiation having an intensity maximum at a wavelength of 5000 nm. The wavelength of the maximum radiation intensity varies by less than 10%. The area of the heat-radiating elements was 2466 cm$^2$. The temperature at the surface of the powder bed and at a depth of 20 mm in the powder bed was measured and recorded. The results are reported in Table 8. The temperature at the surface increased markedly more rapidly here compared to the noninventive examples. By contrast, the temperature at a depth of 20 mm increased only very slowly. It was thus possible to increase the temperature at the surface of the powder bed without excessively heating, and thus unnecessarily subjecting to thermal stress, the powder in lower powder layers.

Example 6

Inventive

A polymer powder having the characteristics reported in Table 1 was applied in a build region having dimensions of 35×35 cm and an area of 1225 cm$^2$ to form a powder bed of 100 mm in height. The powder bed was heated using a radiative heating means. The heat-radiating elements of the radiative heating means emit a radiation having an intensity maximum at a wavelength of 7050 nm. The area of the heat-radiating elements was 1852 cm$^2$. The wavelength of the maximum radiation intensity varies by less than 5%. The temperature at the surface of the powder bed and at a depth of 20 mm in the powder bed was measured and recorded. The results are reported in Table 9. The temperature at the surface increased markedly more rapidly here compared to the noninventive examples. By contrast, the temperature at a depth of 20 mm increased only very slowly. It was thus possible to increase the temperature at the surface of the powder bed without excessively heating, and thus unnecessarily subjecting to thermal stress, the powder in lower powder layers.

TABLE 1 polyamide 12 powder characteristics

| | Value | Unit | Test type/test instrument/test parameter |
|---|---|---|---|
| Polymer | polyamide 12 | | |
| Bulk density | 0.456 | g/cm$^3$ | DIN EN ISO 60. |
| Particle size d50 | 58 | µm | Malvern Mastersizer 2000, dry measurement, metered addition of 20-40 g of powder using Scirocco dry dispersion instrument. Vibratory trough feed rate 70%, dispersing air pressure 3 bar. Sample residence time 5 seconds (5000 individual measurements), refractive index and blue light value fixed at 1.52. Evaluation by Mie theory. |
| Particle size d10 | 32 | µm | Malvern Mastersizer 2000, see particle size d50 for parameters |
| Particle size d90 | 86 | µm | Malvern Mastersizer 2000, see particle size d50 for parameters |
| <10.48 µm | 1 | % | Malvern Mastersizer 2000, see particle size d50 for parameters |
| BET (spec. surface area) | 7.1 | m$^2$/g | ISO 9277, Micromeritics TriStar 3000, nitrogen gas adsorption, discontinuous volumetric method, 7 data points at relative pressures P/P0 from about 0.05 to about 0.20, dead volume calibration using He (99.996%), sample preparation 1 h at 23° C. + 16 h at 80° C. in vacuo, spec. surface area based on devolatilized specimen, evaluation by means of multipoint determination |
| Melting point 1st heating | 187 | ° C. | DIN 53765 Perkin Elmer DSC 7 heating/cooling rate 20K/min |
| Recrystallization temperature | 139 | ° C. | DIN 53765 Perkin Elmer DSC 7 heating/cooling rate 20K/min |
| Material conditioning | Material stored for 24 h at 23° C. and 50% humidity prior to processing/analysis | | |

TABLE 2 polyamide 106 powder characteristics

| | Value | Unit | Test type/test instrument/test parameter |
|---|---|---|---|
| Polymer | polyamide 106 | | |
| Bulk density | 0.438 | g/cm$^3$ | DIN EN ISO 60. |
| Particle size d50 | 66 | µm | Malvern Mastersizer 2000, dry measurement, metered addition of 20-40 g of powder using Scirocco dry dispersion instrument. Vibratory trough feed rate 70%, dispersing air pressure 3 bar. Sample residence time 5 seconds (5000 individual measurements), refractive index and blue light value fixed at 1.52. Evaluation by Mie theory. |
| Particle size d10 | 48 | µm | Malvern Mastersizer 2000, see particle size d50 for parameters |
| Particle size d90 | 91 | µm | Malvern Mastersizer 2000, see particle size d50 for parameters |
| <10.48 µm | 1 | % | Malvern Mastersizer 2000, see particle size d50 for parameters |
| BET (spec. surface area) | 5.3 | m$^2$/g | ISO 9277, Micromeritics TriStar 3000, nitrogen gas adsorption, discontinuous volumetric method, 7 data points at relative pressures P/P0 from about 0.05 to about 0.20, dead volume calibration using He (99.996%), sample preparation 1 h at 23° C. + 16 h at 80° C. in vacuo, spec. surface area based on devolatilized, specimen evaluation by means of multipoint determination |
| Melting point 1st heating | 242 | ° C. | DIN 53765 Perkin Elmer DSC 7 heating/cooling rate 20K/min |

TABLE 2-continued polyamide 106 powder characteristics

| | Value | Unit | Test type/test instrument/test parameter |
|---|---|---|---|
| Recrystallization temperature | 196 | °C. | DIN 53765 Perkin Elmer DSC 7 heating/cooling rate 20K/min |
| Material conditioning | Material stored for 24 h at 23° C. and 50% humidity prior to processing/analysis | | |

TABLE 3

PEEK powder characteristics

| | Value | Unit | Test type/test instrument/test parameter |
|---|---|---|---|
| Polymer | PEEK | | |
| Bulk density | 0.438 | g/cm$^3$ | DIN EN ISO 60. |
| Particle size d50 | 66 | μm | Malvern Mastersizer 2000, dry measurement, metered addition of 20-40 g of powder using Scirocco dry dispersion instrument. Vibratory trough feed rate 70%, dispersing air pressure 3 bar. Sample residence time 5 seconds (5000 individual measurements), refractive index and blue light value fixed at 1.52. Evaluation by Mie theory. |
| Particle size d10 | 48 | μm | Malvern Mastersizer 2000, see particle size d50 for parameters |
| Particle size d90 | 91 | μm | Malvern Mastersizer 2000, see particle size d50 for parameters |
| <10.48 μm | 1 | % | Malvern Mastersizer 2000, see particle size d50 for parameters |
| BET (spec. surface area) | 5.3 | m$^2$/g | ISO 9277, Micromeritics TriStar 3000, nitrogen gas adsorption, discontinuous volumetric method, 7 data points at relative pressures P/P0 from about 0.05 to about 0.20, dead volume calibration using He (99.996%), sample preparation 1 h at 23° C. + 16 h at 80° C. in vacuo, spec. surface area based on devolatilized specimen, evaluation by means of multipoint determination |
| Melting point 1st heating | 242 | °C. | DIN 53765 Perkin Elmer DSC 7 heating/cooling rate 20K/min |
| Recrystallization temperature | 196 | °C. | DIN 53765 Perkin Elmer DSC 7 heating/cooling rate 20K/min |
| Material conditioning | Material stored for 24 h at 23° C. and 50% humidity prior to processing/analysis | | |

TABLE 4

Example 1 temperature measurement

| Time of measurement in min | Uppermost powder layer temperature data point in °C. | 20 mm below powder surface temperature data point in °C. |
|---|---|---|
| 0 | 23 | 23 |
| 0.5 | 32 | 24 |
| 1 | 39 | 25 |
| 1.5 | 44 | 26 |
| 2 | 51 | 27 |
| 2.5 | 55 | 28 |

TABLE 5

Example 2 temperature measurement

| Time of measurement in min | Uppermost powder layer temperature data point in °C. | 20 mm below powder surface temperature data point in °C. |
|---|---|---|
| 0 | 23 | 23 |
| 0.5 | 34 | 24 |
| 1 | 41 | 24 |
| 1.5 | 47 | 25 |
| 2 | 54 | 26 |
| 2.5 | 60 | 27 |

TABLE 6

Example 3 temperature measurement

| Time of measurement in min | Uppermost powder layer temperature data point in ° C. | 20 mm below powder surface temperature data point in ° C. |
|---|---|---|
| 0 | 23 | 23 |
| 0.5 | 41 | 23 |
| 1 | 57 | 23 |
| 1.5 | 68 | 23 |
| 2 | 79 | 24 |
| 2.5 | 90 | 24 |

TABLE 7

Example 4 temperature measurement

| Time of measurement in min | Uppermost powder layer temperature data point in ° C. | 20 mm below powder surface temperature data point in ° C. |
|---|---|---|
| 0 | 23 | 23 |
| 0.5 | 40 | 23 |
| 1 | 55 | 23 |
| 1.5 | 66 | 24 |
| 2 | 75 | 24 |
| 2.5 | 86 | 24 |

TABLE 8

Example 5 temperature measurement

| Time of measurement in min | Uppermost powder layer temperature data point in ° C. | 20 mm below powder surface temperature data point in ° C. |
|---|---|---|
| 0 | 23 | 23 |
| 0.5 | 39 | 23 |
| 1 | 53 | 24 |
| 1.5 | 64 | 24 |
| 2 | 73 | 24 |
| 2.5 | 83 | 25 |

TABLE 9

Example 6 temperature measurement

| Time of measurement in min | Uppermost powder layer temperature data point in ° C. | 20 mm below powder surface temperature data point in ° C. |
|---|---|---|
| 0 | 23 | 23 |
| 0.5 | 44 | 23 |
| 1 | 59 | 23 |
| 1.5 | 71 | 23 |
| 2 | 82 | 23 |
| 2.5 | 94 | 24 |

German patent application 102016205053.2 filed Mar. 24, 2016, is incorporated herein by reference.

Numerous modifications and variations on the present invention are possible in light of the above teachings. It is therefore to be understood that within the scope of the appended claims, the invention may be practiced otherwise than as specifically described herein.

The invention claimed is:

1. A process for layer-by-layer production of three-dimensional objects, said process comprising:
   a) applying a layer of a powder material solidifiable under the action of electromagnetic radiation,
   b) heating the powder material to not more than 10 K below the melting point according to DIN 53765 by simultaneous radiation from high surface area heat-radiating elements from different directions whose maximum radiation intensity is at a wavelength of 5000 nm or at longer wavelengths,
   c) selective melting/sintering of at least a region of the powder material which corresponds to the cross section of the three-dimensional object,
   d) repeating steps a) to e) until the three-dimensional object is obtained, wherein the high surface area heat-radiating elements are not used to conduct the selective melting/sintering.

2. The process according to claim 1, wherein an irradiation power of the heat-radiating element is at least 2000 W/m$^2$ based on a vertically projected area of a powder bed that is to be heated.

3. The process according to claim 1, wherein an area of the heat-radiating elements is altogether at least 100% of a vertically projected area of a powder bed that is to be heated.

4. The process according to claim 1, wherein the powder material has an absorptivity at wavelengths above 5000 nm of at least 0.8.

* * * * *